United States Patent Office 3,794,611
Patented Feb. 26, 1974

3,794,611
PROCESS FOR OIL-EXTENDING RUBBER
George H. Brice, Augusta, N.J., assignor to Uniroyal, Inc., New York, N.Y.
No Drawing. Filed Oct. 7, 1971, Ser. No. 192,719
Int. Cl. C08f 45/28
U.S. Cl. 260—33.6 AQ          15 Claims

ABSTRACT OF THE DISCLOSURE

An improved process for oil-extending rubber involving (A) dissolving a small amount of the rubber (in solid, non-aqueous form) in the extender oil and (B) mixing the resulting rubber/oil premix with additional rubber in an internal mixer. The presence of rubber in the extender oil eliminates the lubricating effect of the oil and sharply reduces the time of mixing.

---

This invention relates to a process for oil-extending rubber.

The two main processes commonly used to make oil-extended rubber are:

(1) Add the extender oil to the rubber in the polymerization plant, either to rubber latex or to cement, as shown in Fig. 1, page 39 of the Vanderbilt Rubber Handbook (ed. 1968), or on page 564 of volume 17 (second edition) of the Encyclopedia of Chemical Technology. This process, which is widely used for synthetic rubber (mostly SBR), has certain undesirable features, including the fact that the oil is processed through the polymer flocking, washing and recovery equipment, thereby in effect limiting the throughput of the polymerization plant. High oil extension is particularly uneconomic by this method.

(2) Add extender oil directly to the rubber in the mill room, either on an open mill or in an internal mixer. The main limitation of this process is that the oil exerts a lubricating action and causes slippage, with resulting slow, inefficient mixing.

The lubricating effect of large amounts of oil is mentioned in an article by H. L. Jacobs (Mixing From a Compounder's Point of View—Rubber World—December 1969) and in British Pat. 1,147,840, Esso Research and Engineering Co., Apr. 10, 1969 (page 1, lines 21–31).

The invention provides a two-stage mixing technique which permits the incorporation of a large amount of extender oil into rubber in an efficient manner at low cost.

Stage A: The first stage of the process involves dissolving a small amount of the rubber polymer in the extender oil to make a "premix" or solution of the rubber in the extender oil.

Stage B: The second stage involves using the rubber-oil premix as a means of oil-extending rubber or rubber-filler master-batches by adding the premix to the desired recipe in an internal mixer. The presence of the elastomer dissolved in the oil premix prevents, almost completely, the slippage effect of the oil on the walls and rotors of the mixer and at the rubber interfaces. The mixing cycle is, therefore, sharply decreased and is close to the time required to blend a rubber batch using commercially available oil extended polymers.

In carrying out the present invention, the first stage (A) involves, as indicated, the provision of a solution of a small amount of the rubber in the extender oil. By "small amount" of rubber is meant that only a fraction of rubber which is to be present in the final oil extended rubber is included at this stage. This amount of rubber is also small in relation to the amount of extender oil used in making the solution. To prepare the solution, the rubber and extender oil are placed in a tank equipped with a stirrer, or in any suitable efficient mixing device, and worked until the rubber is dissolved in the oil. The rubber is preferably used in a form having a large surface area (divided form) to speed up the dissolving process, for example in the form of sheets or as a crumb; as distinguished from prior art in which the rubber is in aqueous latex or cement form, the rubber is used here in solid form. Also to speed up the process, it is preferred that the oil be heated to and maintained at an elevated temperature (e.g., 150–350° F.) until the rubber is dissolved in the oil. The resulting solution possesses considerable tack.

Preferred solutions contain 5–10% rubber and have a viscosity of about 8000 cps. at 75° F., but higher concentrations, up to about 15% or more may also be used. To facilitate handling of the solution and transfer of the solution to the next stage of the process, it is desirable that the rubber-extender oil premix have a viscosity low enough to permit pumping the solution. When using an ordinary pump such as a centrifugal pump for this purpose, the viscosity of the solution is preferably not in excess of about 20,000 cps. (75° F.); using a screw pump, solutions of higher viscosity (e.g., 200,000 cps.; $10^8$ SSU) are practical. To reduce the viscosity, and facilitate handling, the solution may be heated to an elevated temperature. Another way of handling the premix, particularly when it is very viscous, is to package it in a plastic bag (e.g., polyethylene) of the kind sometimes used for packaging rubber compounding materials to be added to a Banbury mixer.

Turning now to the second stage (B) of the process of the invention, this involves, as indicated, mixing the rubber-extender oil solution, prepared in the just-described first stage (A), with additional solid rubber (i.e., dry rubber as distinguished from latex or cement) to provide the desired oil extended rubber stock. For this purpose an internal mixer such as a Banbury mixer or extruder-mixer (U.S. Pat. 2,744,287, Parshall et al., May 8, 1956) may be used, or an open roll mill may be employed, or various combinations of appropriate mixing devices may be used. The invention is based on the discovery that the small amount of dissolved rubber contained in the extender oil prevents, almost completely, the lubricating effect of the oil on the freshly formed surfaces of the rubber and on the surfaces of the mixer with the result that the mixing proceeds efficiently and the time required for the mixing is greatly reduced, compared to the time necessary if the extender oil itself (containing no dissolved rubber) were employed.

The B stage mixing may be aimed at providing simply an oil extended gum (i.e., no filler or other ingredients) or a "masterbatch" [i.e., mix including filler (e.g., carbon black) and/or compounding ingredients]. The solid rubber with which the rubber-extender oil solution is mixed in this second stage may be simply a gum rubber or it may if desired already contain carbon black or other compounding ingredients, or if desired carbon black and/or other desired compounding ingredients may be added as such, either at the beginning of the mixing or at any suitable stage as the mixing proceeds. The usual compounding ingredients may be employed, including antioxidants or stabilizers, processing aids, softeners, lubricants or plasticizers such as small amounts of process oil, activators, accelerators, vulcanizing agents, etc.

It will be understood that the invention is applicable to any rubber conventionally employed in oil extension processes. An important class of rubbers are the diene polymer rubbers, including homopolymers of conjugated diolefins as in polybutadiene (whether emulsion-prepared or solution-prepared; of high cis content or otherwise), polyisoprene (natural or synthetic, stereospecific or otherwise), polychloroprene, etc., and copolymers containing a major proportion of a copolymerized conjugated diolefin as in copolymers of butadiene with such copolymerizable monoethylenically unsaturated monomers as styrene, acrylonitrile, vinyl pyridine, etc. Another important class is the butyl type, which may be defined as a copolymer of a small amount of a conjugated diolefin such as isoprene with an iso-olefin such as isobutylene. Also of importance are the elastomeric copolymers of ethylene with at least one other copolymerizable $C_3$–$C_{12}$ alpha-monoolefin (e.g., propylene) along with at least one polyene, especially a non-conjugated diene, as in the EPDM types (e.g., terpolymers of ethylene and propylene with hexadiene, dicyclopentadiene, methylene norbornene, ethylidene norbornene, methyl tetrahydroindene, etc.).

Similarly, the extender oil employed in the present process may be any extender oil conventionally used for extending any of the foregoing rubbers. As is well known, the extender oils are generally hydrocarbon oils, usually obtained from a petroleum source, and can have paraffinic, naphthenic, or aromatic character.

The economic benefits of the invention are enjoyed to the maximum in preparing relatively highly oil extended rubbers (e.g., 40 parts or more of oil per 100 parts by weight of rubber) since it is with such highly extended rubbers that the prior art practices are particularly uneconomical.

A remarkable feature of the invention resides in the fact that the premix typically contains only a small part (e.g., usually not more than 30%, preferably less than 20%, more preferably only 3–15%) of the total weight of rubber to be used in the process, along with all, or nearly all, of the oil.

When mixing the rubber-extender oil solution with additional rubber to make the final recipe, different charging techniques can be used depending on such variables as the amount of oil involved and the character of the final recipe. In making a passenger car type tire tread recipe containing 43 phr. of oil (that is 43 parts by weight of oil per 100 parts by weight of rubber) very good results have been obtained by charging part (e.g., 10–50% of the total amount of premix to be used) of the rubber-extender oil solution to the Banbury with the additional polymers, mixing until uniform, then adding the carbon black, mixing until blended, and then adding the remainder of the rubber-extender oil solution, and continuing the mixing until the carbon black is well dispersed. More than one premix or rubber-extender oil solution may be used if desired. One such premix being first added to the solid rubber in the Banbury, and another premix being added subsequently, for example in the presence of the carbon black, to complete the oil-extension.

It will be understood that the typical practical final recipe not only contains reinforcing filler and compounding ingredients such as antioxidant, activator, accelerator and, finally, vulcanizing agent, but is also frequently based on more than a single elastomer. Where only a single elastomer is used, the rubber contained in the preliminary rubber-extender oil solution premix is of course the same as the additional solid rubber added in the final mixing. When the final mix contains more than one rubber, then the rubber employed to make the rubber-extender oil solution may be different from the additional solid rubber charged in step (B). Usually the rubber in the rubber-extender oil solution is the same as at least one of the polymers added in the final mix. More than one kind of rubber may be contained in the premix if desired, or two different premixes, each containing a different rubber (and/or a different concentration of rubber) may be used. It is also possible for one of the solid rubbers added in the final recipe to be itself a conventionally oil extended rubber.

The following examples, in which all quantities are expressed by weight, will serve to illustrate the practice of the invention in more detail.

EXAMPLE I

Stage A: Two-hundred grams of cis-BR are sheeted out on a mill, cut into pieces, and added to 1800 grams of aromatic oil in a stirring vessel. The cis-BR is a controlled structure, solution-prepared polybutadiene rubber with a cis content of approximately 93%; water content less than 0.3% ["Cisdene 100" (trademark), American Synthetic Rubber Corp.]. The oil is a petroleum hydrocarbon, specific gravity 0.9806 at 60° F.; aniline point 116° F.; viscosity 3000 SUS at 100° F.; ASTM D–2226, Type 102 ["Sundex 790" (trademark), Sun Oil Co.]. After two hours of stirring at 270° F. the rubber is completely dissolved in the oil, thus providing a 10% solution of rubber in oil. The viscosity of the solution is about 8000 cps. at 75° F.

Stage B: The foregoing rubber-oil premix is mixed in a "B" Banbury according to the recipe shown in Table I.

TABLE I

Recipe; Stage B

| Ingredients: | Parts |
| --- | --- |
| SBR (23% bound styrene; moisture less than 0.3%) | 70.0 |
| Cis-BR (Cisdene 100) | [1] 25.4 |
| 10% rubber-oil solution from Stage A | [1] 46.6 |
| Carbon black (ISAF) | 70.0 |
| Zinc oxide | 3.0 |
| Stearic acid | 1.0 |
| N-cyclohexyl-2-benzothiazole sulfenamide | 1.0 |
| Diphenyl guanidine | 1.3 |
| Sulfur | 1.75 |

[1] Cis BR 30, oil 42.

The polymers and ⅓ of the rubber-oil solution are added to the Banbury and mixed at 50 r.p.m. After ½ minute the carbon black and zinc oxide are added. After another minute of mixing the remainder of the rubber-oil solution is added. When the temperature of the mix has reached 250° F., the stearic acid is added and when the temperature reaches 300–320° F., the batch is dumped. The total mixing time is 5.5 minutes. The sulfur and accelerators are added in 12 end passes on a rubber mill.

For comparison a duplicate run is made with the exception that the added oil does not contain any rubber. To reach the same level of filler dispersion the total time of mixing in the Banbury is 15 minutes.

EXAMPLE II

Stage A: One hundred grams of EPDM rubber is dissolved in 1900 grams of paraffinic oil, using the procedure described in Example I. The EPDM is an ethylene-propylene-1,4-hexadiene terpolymer containing 35% propylene; iodine number 8; Mooney viscosity 54 ML–4 at 120° C.; intrinsic viscosity 2.4; moisture less than 0.3%. [Nordel 729 (trademark), E. I. du Pont Co.] The oil is ASTM D–2226 type 104B, viscosity 508 SUS at 100° F. ["Sunpar 150" (trademark), Sun Oil Co.]

Stage B: The 5% rubber in oil premix from Stage A is mixed in a "B" Banbury according to the recipe shown in Table II.

TABLE II

Recipe; Stage B

| | |
| --- | --- |
| EPDM | [1] 96.25 |
| Premix | [1] 78.75 |
| Carbon black | 100.00 |

Charging procedure

| Time: | |
| --- | --- |
| 0.0 | 175° F.—Charge polymer. |
| 0.5 | ⅕ of premix. |
| 2.0 | Carbon black. |
| 3.0 | ⅘ of premix. |
| 5–6 | 300–320° F.—Discharge. |

[1] EPDM 100, oil 75.

After 5 to 6 minutes of mixing a good carbon black dispersion is achieved.

EXAMPLE III

Two hundred grams of natural rubber (SSR2: water content less than 0.3%) is sheeted, cut into pieces, and added to 1800 grams of aromatic oil (Sundex 790 previously described) in a stirring vessel. After about two hours at 300° F. the rubber is completely dissolved in the oil.

The 10% rubber-extender oil premix is added to untreated natural rubber (SSR2) in a "B" Banbury in proportions such as to provide the final amount of oil shown in Table III, which indicates the time required for the blend to be completely mixed.

TABLE III

| Final amount of oil (phr.): | Time (min.) |
|---|---|
| 35 | 3 |
| 50 | 6.5 |
| 75 | 9.5 |
| 100 | 11.5 |

EXAMPLE IV

This example demonstrates the reduction of Banbury mixing time by using the oil in the form of a premixed rubber-oil in solution in accordance with the invention. The premix employed in Run IV-1 (invention) in Table IV below contains 25% cis-BR ("Cisdene-100" previously described) in aromatic petroleum hydrocarbon extender oil ("Sundex 790" previously described). In Run IV-1 the premix is blended with SBR (same as previously described) and cis-BR ("Cisdene-100"). In Run IV-2 (outside the invention; control mix included for purposes of comparison), the same polymers are present in the same amount, but the extender oil is added as such instead of as a premixed solution. In both runs, a "B" Banbury is used. 80% volume fill, constant 75 r.p.m. speed, 225° F. starting temperature. The dry rubbers are given a 0.5 minute churn before addition of the premix or oil; this churn is part of the total time recorded. In the course of the mixing, the power demand as shown in Table IV is read on an ammeter which measures the current consumption by the Banbury motor. The initial reduction and subsequent slow rise for Run IV-2 (control) indicates that the mix is slipping and mixing action is poor. The same absolute amount of oil is being added and mixed in Run IV-1 as in Run IV-2. A leveling off of power demand indicates completion of the mix. It may be seen from Table IV that in Run IV-1 representing the invention the mixing time is cut in half as a result of using oil in the form of a rubber-oil premix.

TABLE IV

| | Run IV-1 (invention) | Run IV-2 (control) |
|---|---|---|
| | Parts by weight | |
| Ingredients: | | |
| SBR rubber | 70 | 70 |
| Cis-BR rubber | 16 | 30 |
| Extender oil | | 42 |
| Premix (25% rubber in oil) | 56 | |
| | Power demand, amps. | |
| Total mix time, min.: | | |
| 1 | 10 | 8 |
| 2 | 13 | 7 |
| 3 | 23 | 7 |
| 4 | 28 | 8 |
| 5 | 29 | 10 |
| 6 | | 15 |
| 7 | | 24 |
| 8 | | 28 |
| 9 | | 29 |
| 10 | | 29 |

EXAMPLE V

In this example two different premixes are employed:
Stage A: Premix A-1. To make the first premix 26 parts of cis-BR No. 5708 (a very high molecular weight polybutadiene rubber have essentially 100% cis configuration) is formed into a crumb by shearing on a warm mill and then 35 parts of aromatic extender oil ("Sundex 790," previously described) heated to a temperature of 190–200° C. is poured over it (total 61 parts). Sorption of the oil by the crumb is immediate and complete.

Premix A-2. A second premix is made in the same manner as Premix A-1 except that 4 parts of the cis-BR No. 5708 is used and 7 parts of the aromatic extender oil (total 11 parts).

Stage B: Stage B is carried out in a plurality of mixing steps. In the first step of Stage B, 70 parts of the SBR described in Example I is worked in the Banbury mixer, starting temperature 200–225° F., speed 50 r.p.m., for 0.5 minute, whereupon 61 parts of Premix A-1 is added and mixing continued (total 131 parts). The power demand levels out in 3 minutes. The mix is dumped at 3.5 minutes, temperature 250° F., and appears uniform at this point.

In the next step of stage (B), the following ingredients are charged to the Banbury along with 131 parts of the mix resulting from step 1 of stage (B); 70 parts carbon black (type N-285), 3 parts zinc oxide, 1.3 parts N-cyclohexyl-2-benzothiazole sulfenamide, 0.3 part diphenylguanidine and 2.0 parts stearic acid. The starting temperature is 200–225° F., speed 50 r.p.m. After mixing for 3 minutes, 11 parts of Premix A-2 is added (total 218.6 parts). After 5 minutes mixing, the mix is dumped, sheeted out, and stored 24 hours at room temperature.

Thereafter, 2 parts of sulfur is added to 218.6 parts of the foregoing mixture on a roll mill to complete the oil-extended vulcanizable rubber tire tread stock recipe.

Microscopic examination following vulcanization shows only 0.95 volume percent undispersed carbon black.

EXAMPLE VI

A premix which is a 10% solution of SBR (described in Example I) in aromatic extender oil ("Sundex 790" previously described) is made by agitating the SBR in the oil heated to 270° F.

The recipe for the masterbatch to be prepared is:

| | |
|---|---|
| SBR (added as solid rubber) | 80 |
| Premix | 195 |
| Carbon black (ISAF) | 175 |

The over-all recipe therefore contains 100 parts of SBR and 175 parts of extender oil.

To the Banbury mixer heated to 250° F. the 80 parts of the SBR is charged and after 0.5 minute of mixing ¼ of the premix (49 parts) is added. After 2 minutes of mixing, 175 parts of carbon black (ISAF) is added. At 4 minutes mixing time the remaining ¾ of premix (146 parts) is added. At 6 to 8 minutes (temperature 300–320° F.) the batch is discharged.

Well dispersed carbon black is obtained using this procedure.

Having thus described my invention, what I claim and desire to protect by Letters Patent is:

1. A non-aqueous process for oil-extending rubber in the solid, dry state comprising in combination the following steps:

Stage A: preparing a non-aqueous premix by dry mixing a small amount of dry solid rubber with a non-aqueous extender oil to be used for extending the rubber, thereby forming a non-aqueous solution of rubber in oil containing 5–15% by weight of rubber; and Stage B: subsequently dry mixing the said non-aqueous premix of rubber and oil from Stage A with a large amount of additional dry solid rubber to form an oil extended rubber, the said amount of rubber contained in the extender oil in the premix serving to prevent slippage that would otherwise be caused by the oil during the said Stage B mixing, whereby a uniform mix is obtained in a minimum of mixing time.

2. A process as in claim 1 in which the rubber is at least one rubber selected from the group consisting of conjugated diolefin polymer rubbers and elastomeric interpolymers of ethylene with at least one other copolymerizable $C_3$-$C_{12}$ alphamonoolefin and at least one polyene.

3. A process as in claim 2 in which the rubber is at least in part a homopolymer of a conjugated diolefin.

4. A process as in claim 2 in which the rubber is at least in part a butadiene-styrene copolymer.

5. A process as in claim 2 in which the rubber is an ethylene-propylene-non-conjugated diene terpolymer.

6. A process as in claim 1 in which the extender oil is a petroleum hydrocarbon extender oil selected from the group consisting of paraffinic, naphthenic, and aromatic extender oils.

7. A process as in claim 1 in which carbon black is present in Stage B.

8. A process as in claim 1 in which the said premix is prepared in Stage A by pouring hot extender oil over the rubber in crumb form whereby the extender oil is absorbed by the rubber crumb.

9. A non-aqueous process for oil-extending rubber in the solid, dry state comprising in a combination the following steps:

Stage A: preparing a non-aqueous premix by mixing under non-aqueous conditions only a part of the total amount of rubber to be used in the process with a non-aqueous extender oil to be used in the process, the rubber being employed in dry solid divided sheet or crumb form, thereby forming a tacky non-aqueous solution of rubber in oil containing 5–10% by weight of rubber;

Stage B: subsequently dry mixing the said non-aqueous premix with the remainder of the rubber in dry solid form to form an oil extended rubber having the desired level of oil, the said rubber in the premix serving to prevent slippage that would otherwise be caused by the oil during the said Stage B mixing, whereby a uniform mix is obtained in a minimum of mixing time.

10. A process as in claim 9 in which the said Stage B is carried out in two mixing steps, in the first of which only a part of the total amount of premix to be used is present along with the said additional solid rubber, and in the second of which carbon black is mixed is followed by an additional amount of premix and mixing is continued in the presence of carbon black to produce a uniform dispersion of the carbon black in the oil extended rubber.

11. A process as in claim 10 in which a single rubber is employed.

12. A process as in claim 10 in which more than one rubber is employed.

13. A non-aqueous process for oil-extending rubber in the solid, dry state comprising in combination the steps of:

(A) preparing a non-aqueous premix which is a pumpable solution of 5–15% by weight of dry solid rubber dissolved in a non-aqueous extender oil, the rubber and oil as initially brought together to form said solution both being in a non-aqueous state;

(B) masticating the said non-aqueous premix in an internal mixer with sufficient additional dry solid rubber to provide an oil extended stock containing from 35 to 175 parts of extender oil per 100 parts of rubber; the rubber dissolved in the oil in the premix representing only 3 to 15% of the total weight of rubber to be used in the process and serving to prevent the extender oil from causing slippage in the said mixing step (B), whereby the mixing time required in step (B) to produce a uniform oil extended rubber is reduced.

14. A non-aqueous process for preparing an oil extended rubber-carbon black masterbatch comprising in combination the steps of:

(A) agitating divided non-aqueous dry solid rubber with non-aqueous extender oil heated to a temperature of 150–350° F., until the rubber is dissolved in the oil, the proportions of rubber and extender oil being such as to provide from 5 to 15% by weight of rubber in the resulting non-aqueous solution;

(B) masticating a part of the non-aqueous solution from step (A) with additional solid rubber in an internal mixer, subsequently adding carbon black and mixing further, thereafter adding additional solution from step (A) to the mixture, and continuing the mastication until a uniform dispersion of the carbon black in the oil extended rubber is obtained, the proportions of said solution and additional solid rubber being such as to provide from 35 to 175 parts by weight of extender oil per 100 parts by weight of rubber in the final masterbatch, the rubber dissolved in the extender oil in the said solution from step A serving to prevent the extender oil from causing slippage during the mastication with the additional solid rubber in step B, whereby the mixing time required in step B to produce uniform dispersion of carbon black in the oil extended rubber masterbatch is reduced.

15. A process as in claim 14 in which the amount of rubber employed in step (A) represents not more than 15% of the total weight of rubber employed in the entire process and the extender oil employed in step (A) represents the entire amount of extender oil used in the process.

References Cited

UNITED STATES PATENTS

| | | | |
|---|---|---|---|
| 2,449,929 | 9/1948 | Corkey | 260—33.6 AQ |
| 3,676,387 | 7/1972 | Lindlof | 260—33.6 AQ |
| 2,639,275 | 5/1953 | Vickers | 260—33.6 AQ |
| 2,978,427 | 4/1961 | Pullar | 260—33.6 AQ |

OTHER REFERENCES

Rubber Age, vol. 69, No. 5, August 1951, pp. 559 and 560.

ALLAN LIEBERMAN, Primary Examiner

P. R. MICHL, Assistant Examiner